US012703083B2

(12) United States Patent
Nighswander et al.

(10) Patent No.: US 12,703,083 B2
(45) Date of Patent: Aug. 11, 2026

(54) COBOT WELDING SYSTEM

(71) Applicant: APT MANUFACTURING SOLUTIONS, Hicksville, OH (US)

(72) Inventors: Anthony R. Nighswander, Leo, IN (US); Roger W. Sanders, Antwerp, OH (US); Chad A. Sprow, Continental, OH (US); James M. Frantom, Jr., Edon, OH (US)

(73) Assignee: APT MANUFACTURING SOLUTIONS, Hicksville, OH (US)

(*) Notice: Subject to any disclaimer, the term of this patent is extended or adjusted under 35 U.S.C. 154(b) by 285 days.

(21) Appl. No.: 18/321,500

(22) Filed: May 22, 2023

(65) Prior Publication Data

US 2024/0391091 A1 Nov. 28, 2024

(51) Int. Cl.

*B25J 9/08* (2006.01)
*B25J 9/00* (2006.01)
*B25J 9/16* (2006.01)
*B25J 11/00* (2006.01)

(52) U.S. Cl.

CPC ............... *B25J 9/08* (2013.01); *B25J 9/0096* (2013.01); *B25J 9/162* (2013.01); *B25J 11/005* (2013.01)

(58) Field of Classification Search

CPC ... B25J 5/00; B25J 5/007; B25J 9/0096; B25J 11/005

See application file for complete search history.

(56) References Cited

U.S. PATENT DOCUMENTS

| | | | | | |
|---|---|---|---|---|---|
| 4,027,878 | A * | 6/1977 | Dadbeh | A63D 15/00 | 473/29 |
| 5,161,797 | A * | 11/1992 | Frasca | A63D 15/00 | 473/29 |
| 5,839,966 | A * | 11/1998 | Eisenhauer | A63D 15/00 | 473/29 |
| 5,937,924 | A * | 8/1999 | Cooper | B25H 1/04 | 83/477.1 |
| 6,244,969 | B1 * | 6/2001 | Murphy | A63D 15/00 | 473/29 |
| 9,896,117 | B1 * | 2/2018 | Wong | B25H 1/16 | |
| 2006/0213578 | A1 * | 9/2006 | Haag | B25H 1/10 | 144/286.5 |
| 2008/0156235 | A1 * | 7/2008 | Keirstead | A47B 13/003 | 108/146 |
| 2008/0245441 | A1 * | 10/2008 | Blum | B25H 1/04 | 144/286.5 |
| 2008/0253871 | A1 * | 10/2008 | Bergeron | B23P 21/004 | 414/281 |
| 2011/0247530 | A1 * | 10/2011 | Coffman | A47B 9/14 | 108/116 |
| 2017/0173779 | A1 * | 6/2017 | Luis y Prado | B25H 1/10 | |
| 2018/0290290 | A1 * | 10/2018 | Uchiyama | B25J 5/007 | |
| 2022/0274218 | A1 * | 9/2022 | Ulmer | B23Q 1/74 | |
| 2022/0402147 | A1 * | 12/2022 | Martin | B25J 15/0266 | |
| 2023/0085100 | A1 * | 3/2023 | Akey | B25J 11/0055 | 83/39 |
| 2024/0123534 | A1 * | 4/2024 | Akey | B23K 9/0953 | |
| 2024/0261909 | A1 * | 8/2024 | Akey | B25J 11/005 | |

* cited by examiner

*Primary Examiner* — Kyle A Cook
(74) *Attorney, Agent, or Firm* — TAYLOR & EDELSTEIN, PC

(57) ABSTRACT

A cobot welding system includes: at least one modular support device configured for having coupled thereto and thus for supporting thereby at least one modular accessory such that the cobot welding system is modular.

9 Claims, 9 Drawing Sheets

222
653B
653A
662
653A
653B
653A
651B
653A
653B
652
651
221
651D
653B
653A
651C
653A
653B
653A
662
222
653A
113
653B
651A
109
102A

COBOT WELDING SYSTEM

BACKGROUND OF THE INVENTION

1. Field of the Invention

The present invention relates to collaborative robot systems, and, more particularly, to collaborative robot welding systems.

2. Description of the Related Art

As is well known, welding involves joining together two parent pieces or parts of base material by heat and/or pressure, the base material of the parent pieces or parts being metal, plastic, or wood. With respect to joining parent pieces or parts of metal (which can be referred to as parent workpieces or as workpieces) together by way of heat welding, the heat can be provided by an electrical arc, by what is known as arc welding. Different types of arc welding include the following: gas metal arc welding (GMAW) (also known as metal inert gas welding (MIG welding)); gas tungsten arc welding (GTAW) (also known as tungsten inert gas welding (TIG welding)); shield metal arc welding (SMAW) (also known as stick welding); and flux cored arc welding (which also includes a self-shielded variety (FCAW-S) and a gas shielded variety (FCAW-G)). Welders often use tables to support the parent workpieces during welding and can employ a variety of tools to accomplish the welding, as is well known. Tables can be pushed together to create a larger workspace to perform the welding operation, and the welding tools can be stored in toolboxes or in or attached to at least one of the tables.

As is also known, robots have been developed to perform a variety of tasks. Historically, robots performing manufacturing operations could be dangerous to human beings, such that the operation of these robots would need to be located at a safe distance from, or otherwise shielded from, human beings who might otherwise be in the vicinity of these robots.

To make robots acceptably safe to operate in a space that is also occupied by or physically close to human beings, collaborative robots have been developed. Collaborative robots-which are often referred to simply as "cobots"—are designed to "collaborate" with human beings, as the shortened form of the name suggests. As such, cobots may jointly accomplish a manufacturing task, for example, together with human beings near the cobot. To make this collaboration safe for the human being, the cobot may have, for example, a proper external covering or "skin" to cover the internal parts of the cobot, softened (i.e., rounded) edges or joints, relatively slowly moving aspects of certain ones of the cobot's movements, sensors that may sense the presence or touch of a human being so that the cobot can stop or appropriately slow down its movement, and/or the ability to be moved or otherwise repositioned by a human being.

Cobots have been used to perform welding operations, in collaboration with human fabricators, and some such cobots are part of a cobot welding system. However, depending upon the type of welding, the welding application, and/or the fabricator, the workspace of the cobot welding system may not be as efficient as possible.

What is needed in the art is the ability to customize readily the welding workspace depending upon the type of welding, the application, and/or the fabricator.

SUMMARY OF THE INVENTION

The present invention provides a cobot welding system at least one modular cart configured for having attached thereto at least one modular accessory such that the cobot welding system is modular.

The invention in one form is directed to a cobot welding system, including: at least one modular support device configured for having coupled thereto and thus for supporting thereby at least one modular accessory such that the cobot welding system is modular.

The invention in another form is directed to a method of using a cobot welding system, the method including the steps of: providing at least one modular support device; and coupling at least one modular accessory to the at least one modular support device, and thereby supporting the at least one modular accessory such that the cobot welding system is modular.

An advantage of the present invention is that the workspace associated with the cobot welding system is readily configurable according to a variety of factors, such as the type of welding, the welding application, and/or the fabricator. In this way, a fabricator can use a single modular cart or a plurality of modular carts selectively in a variety of arrangements, in a way that maximizes the use of the cobot and the fabricator. Similarly, a fabricator can employ one or more modular accessories at a variety of different selectable locations and in a variety of combinations.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
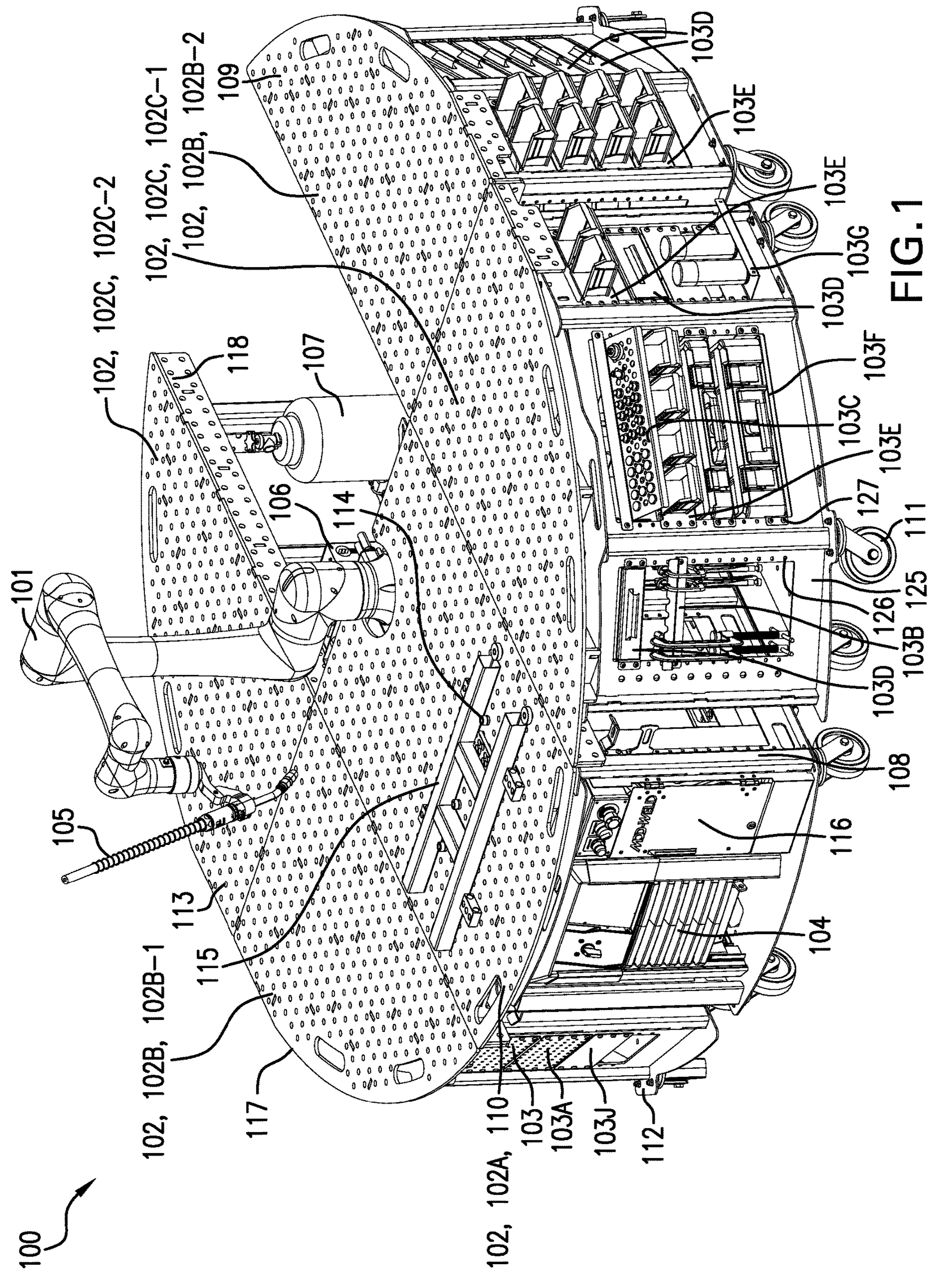
FIG. 1 illustrates a perspective view of a cobot welding system, the cobot welding system including a plurality of modular carts and a plurality of modular accessories, in accordance with an exemplary embodiment of the present invention.

Referring now to the drawings, and more particularly to FIG. 1, there is shown a collaborative robot ("cobot") welding system 100, which is modular. By being a welding system, system 100 is configured for performing at least one welding operation or task. By being modular, system 100 includes modules (including, but not necessarily limited to, devices 102 and accessories 103) that are standardized in size and configuration such that these modules are configured for being selectively coupled with one another selectively in a variety of configurations, depending upon which modules are selected. Thus, system 100 generally includes a cobot 101, at least one modular support device 102, and at least one modular accessory 103. Thus, system 100 includes at least one modular support device 102 configured for having coupled thereto and thus for supporting thereby at least one modular accessory 103 such that cobot welding system 100 is modular. Modular support device 102 can be generally immobile or, alternatively, can be readily made to be mobile. For instance, modular support device 102 can be formed as a modular cart 102 and thereby be configured for being moved on wheels 111 of modular cart 102 (which is assumed to be the case herein).

Cobot 101, as indicated, is a collaborative robot. Thus, cobot 101 is configured for being used by a human being in the near vicinity of and/or at least at times in contact with cobot 101. As such, cobot 101 may jointly accomplish a manufacturing task—in this case, welding—together with human beings near the cobot. To make this collaboration safe for the human being, cobot 101 may have, for example, a proper external covering or "skin" to cover internal parts of cobot 101, softened (i.e., rounded) edges or joints, relatively slowly moving aspects of certain ones of movements of cobot 101, sensors that may sense the presence or touch of a human being so that cobot 101 can stop or appropriately slow down the movement of cobot 101, and/or an ability to be moved or otherwise repositioned by a human being, such as a welding fabricator working together with cobot 101 to complete a welding task. Cobot 101 may be configured for performing any suitable welding task using any type of welding, which includes, but is not limited to, any type of arc welding. Any suitable cobot 101 may be used. For example, cobot 101 may be a six-axis robot made by FANUC, such as FANUC CRX-10iA/L (the power needed can be whatever is suitable, such 110 V, 20 amp). Though it can be appreciated that the present invention is not limited to any specific dimensions or sizes, cobot 101 can optionally have a reach of 55 inches. FANUC's collaborative robots are easy to teach and to deploy, and thus such robots are well-suited for high-mix, low-volume production while maintaining high quality welds. Thus, cobot 101 is configured for performing a welding task.

The cobot welding system of the present invention can be configured to perform selectively different types of welding, such as arc welding, such as MIG welding, TIG welding, stick welding, and flux cored arc welding. For the sake of discussion, system 100 herein is assumed to be configured to perform MIG welding, unless stated otherwise. To accomplish the welding task such as MIG welding for example, system 100 may further include any suitable additional items. Thus, system 100 can include a suitable power supply 104 for the welding operation. Power supply 104 can be attached to and carried by modular cart 102 (in particular, base cart 102A) in any suitable manner, such as by way of fasteners or the like. Power supply 104 is electrically coupled with cobot 101. Power supply 104 can be, for example, an Auto-Continuum™ 350 made by Miller (the power can be whatever is needed, such as 230-575 V 3-phase, 50/60 Hz). System 100 can further include a suitable welding torch 105 (which can be deemed to be part of cobot 101), a wire feed assembly 106 (such as for MIG welding or flux cored arc welding), and a shielding gas container 107. Wire feed assembly 106 can include a spool 334 (FIG. 3) which is configured for holding thereon an electrical conductor (i.e., a wire, whether sheathed or not) used in the welding operation, wherein the electrical conductor is consumable. Wire feed assembly 106 can further include a device 335 (FIG. 3) which supplies the electrical conductor from the spool, as well as a gas from shielding gas container 107, to cobot 101 and thus to welding torch 105. Shielding gas container 107 is configured for storing therein a shielding gas, such as argon, or the like. Such shielding gas container 107 can be formed as a cylindrical tank, as is known.

The at least one modular cart 102 can selectively include a plurality of carts 102A, 102B, and 102C. That is, the at least one cart 102 can optionally be a single cart 102 or a plurality of carts 102. Cart 102 (referenced merely as "102") generically refers to all carts 102A, 102B, 102C, and thus a description of cart 102 applies to all carts 102A, 102B, 102C. Each cart 102 includes a frame 108 and a horizontal support structure 109 mounted to frame 108. Frame 108 can be made of any suitable material, such as stainless steel, and can be made by way of any suitable manufacturing process. Horizontal support structure 109 can be formed as a tabletop 109 that mounts atop frame 108. Horizontal support structure 109 can be made of any suitable material, such as stainless steel, and can be made by way of any suitable manufacturing process. Suitable fasteners, such as nuts and bolts, or the like, and/or welding can couple together frame 108 and horizontal support structure 109. Tabletop 109 defines a welding workspace 110 for cobot 101 and the user (who can also be referred to as a fabricator). Tabletop 109 includes a plurality of holes 113. Holes 113 are configured to receive therein a respective pin 114, one or a plurality of which is configured to help hold a workpiece 115 and/or a welding fixture in place for a welding operation. Workpiece 115 is merely provided by way of example, and thus it can be appreciated that a variety of workpieces and/or welding fixtures can be attached to tabletop 109 via holes 113 in order to fix or otherwise stabilize the workpiece and/or welding fixture in place for the welding operation. Further, each cart 102 can include a plurality of casters 111 (such as swivel casters) attached in suitable locations to frame 108, casters 111 being configured for enabling cart 102 to be readily moved, such as by way of a user pushing cart 102 across a floor to a select location. Further, one or more casters 111 of each cart 102 can include a braking or locking mechanism 112 to enable cart 102 to be at least substantially locked in place. Casters 111 can optionally be six-inch casters (i.e., six inches in diameter).

Cart 102A is base cart. Cobot 101 is mounted to cart 102A in any suitable manner (see FIG. 7). Welding torch 105 is mounted to an arm of cobot 101. Further, the following is also mounted to base cart 102A (it can also be said that base cart 102A includes the following): power supply 104; wire feed assembly 106; shielding gas container 107; controller 219; and storage container 116 (storage container 116 is configured for selectively storing therein, and optionally for selectively locking therein, an input/output device 720 (FIG. 7)), which can be formed as a handheld tablet 720). Though it can be appreciated that the present invention is not limited to any specific dimensions or sizes, base cart 102A can optionally define a footprint of 40 inches (width)×78 inches (depth), define a table workspace of 40 inches (width)×58½ inches (depth), and have a payload of 10 kg. Base cart can have a generally rectangular configuration, but with one longitudinal end have a curved edge.

Carts 102B and 102C are each a side cart. Side carts 102B, 102C can be directly connected to base cart 102A and/or one another. That is, side cart 102B can be directly connected to base cart 102A and/or side cart 102C, and side cart 102C can be directly connected to base cart 102A and/or side cart 102B. FIG. 1 shows base cart 102A connected directly to side carts 102B and 102C, and these side carts 102B and 102C are directly connected to additional side carts 102C and 102B, respectively. Cart 102B can selectively include a plurality of carts 102B, such as carts 102B-1 and 102B-2. That is, the at least one cart 102B can optionally be a single cart 102B or a plurality of carts 102B, such as carts 102B-1, 102B-2. Side cart 102B generically refers to all side carts 102B-1, 102B-2, and thus a description of side cart 102B applies to all side carts 102B (which includes side carts 102B-1, 102B-2). In this way, side carts 102B-1 and 102B-2 are substantially similar to one another, but not necessarily with respect to which ones of, or how many of, accessories 103 are attached to or otherwise coupled with side carts 102B-1 and 102B-2. Similarly, cart 102C can selectively include a plurality of carts 102C, such as carts 102C-1 and 102C-2. That is, the at least one cart 102C can optionally be a single cart 102C or a plurality of carts 102C, such as carts 102C-1, 102C-2. Side cart 102C generically refers to all side carts 102C-1, 102C-2, and thus a description of side cart 102C applies to all side carts 102C (which includes side carts 102C-1, 102C-2). In this way, side carts 102C-1 and 102C-2 are substantially similar to one another, but not necessarily with respect to which ones of, or how many of, accessories 103 are attached to or otherwise coupled with side carts 102C-1 and 102C-2. As shown in FIG. 1, cart 102A is connected directly to carts 102B-1 and 102C-1, cart 102B-1 is connected directly to cart 102C-2, and cart 102C-1 is connected directly to cart 102B-2. That is, according to the embodiment of the present invention shown in FIG. 1, system 100 includes one base cart 102A, two side carts 102B-1, 102B-2, and two side carts 102C-1, 102C-2. Thus, system 100 includes base cart 102A and selectively side carts 102B-1, 102B-2, 102C-1, 102C-2. The term "selectively" herein refers to flexibility with respect to system 100 in terms of which one or more side carts 102B, 102C (102B-1, 102B-2, 102C-1, 102C-2), and which one or more accessories 103, may constitute system 100 on a given occasion; in FIG. 1, system includes each of 102B-1, 102B-2, 102C-1, 102C-2, and several accessories 103.

As shown in FIG. 1, carts 102A, 102B-1, 102B-2, 102C-1, 102C-2 collectively form a substantially round perimeter 117. The term "substantially" here accounts for manufacturing tolerances, for the fact that perimeter 117 may have a gap 118 between carts 102, for the fact that perimeter 117 may include straight edges in certain places, and for the fact that perimeter 117 may not be perfectly round even absent any straight edges or at least one gap 118. Gap 118 provides a way for a user to access certain structures attached to base 102A for servicing, maintenance, and/or changing out parts, and to access other parts of carts 102 or accessories 103 from a different position or angle. Further, gap 118 accounts for cobot 101, at least in some embodiments of cobot 101, not being able to rotate a complete 360° circle about a vertical axis, but, rather, may only be able to rotate via an angular swath of less than 360° (by way of example and not limitation, 315°), substantially as defined by tabletops 109, which define the workspace for cobot 101. In this way, cobot 101 may be programmed or otherwise "taught" using tablet 720 to perform separate and distinct welding operations at various places of workspace 110 defined by tabletops 109 of 102A, 102B-1, 102B-2, 102C-1, 102C-2. For example (and not by way of limitation), a separate and distinct welding task may occur respectively at each of carts 102A, 102B-1, 102B-2, 102C-1, 102C-2, each of which may define a distinct work station within workspace 110. Thus, for instance, the fabricator may be performing a task at one of the carts 102A, 102B-1, 102B-2, 102C-1, 102C-2 while cobot 101 is performing a welding task at another one of carts 102A, 102B-1, 102B-2, 102C-1, 102C-2, and cobot 101 and/or the fabricator may change carts 102A, 102B-1, 102B-2, 102C-1, 102C-2 in which to operate at for a next task. For instance, while cobot 101 is welding at a different work station, the fabricator at another work station may be readying a welding fixture or parts to be welded in order to get ready for cobot 101 to perform the welding operation, or the fabricator may be moving a weldment after cobot 101 has performed the welding task. In this way, cobot 101 is configured for performing a welding task selectively at carts 102A, 102B-1, 102B-2, 102C-1, and/or 102C-2, or at cart 102A and at carts 102B-1, 102B-2, 102C-1, and/or 102C-2.

Though FIG. 1 shows system 100 as including five carts 102, system 100 can selectively include one or more carts 102. For example, according to one embodiment of the present invention, system 100 includes only one cart 102, namely, cart 102A, to which is attached cobot 101. At a minimum, system 100 must have at least base cart 102A. In addition to base cart 102A, the cobot welding system of the present invention can include a variety of combinations of carts 102B and/or 102C. For instance, the cobot welding system of the present invention may include any of the following combinations in addition to system 100 (which includes five carts 102): (a) carts 102A, 102B-1; (b) carts 102A, 102B-1, 102C-2; (c) carts 102A, 102C-1; (d) carts 102A, 102C-1, 102B-2; (e) carts 102A, 102B-1, 102C-1; (f) carts 102A, 102B-1, 102C-2, 102C-1; or (g) carts 102A, 102C-1, 102B-2, 102B-1.

FIG. 1 also shows that system 100 includes a plurality of modular accessories 103. In this way, the at least one modular accessory 103 can include a plurality of modular accessories 103. That is, the at least one accessory 103 can optionally be a single accessory 103 or a plurality of accessories 103. Accessory 103 (referenced merely as "103") generically refers to all accessories 103 (regardless of whether a letter is attached to "103," such as "103A"). Each accessory 103 can be mounted at a select location of cart carts 102A, 102B, and/or 102C. Accessory 103 can be one of a variety of different accessories, each of which can be coupled selectively with a respective cart 102. Accessory 103 can be any of the following: a pegboard panel 103A; a clamp hanger rail 103B; a fixture setup pin rail 103C; a drawer 103D; a bin box panel 103E; a storage shelf 103F; a spray can shelf 103G; a drawer divider 103H; a tabletop weld screen (not shown); a blanking closeout plate 103J; and an angle grinder hanger (not shown). Many if not all of accessories 103 can come in standardized sizes, including for example wide versions or narrow (with respect to width) versions, or tall or short versions (with respect to height) (tall and short can also be referenced as deep or shallow, respectively). All sizes, dimensions, and materials of accessories are provided merely by way of example, such that the present invention is not limited by any such sizes, dimensions, or materials. Each cart 102 includes at least one mounting plate 125 (attached to or formed integral with frame 108) that includes vertically aligned side holes 126. Certain ones of the accessories 103—namely, 103A, 103B, 103C, 103D, 103E, 103F, 103G, 103J (as well as the angle grinder hanger)—include sides that include at least one hole 127 (often vertically aligned holes 127). Holes 126, 127 can be aligned with one another, and fasteners (i.e., bolts and nuts) or the like can extend therethrough and be fixed such that the respective accessory 103A, 103B, 103C, 103D, 103E, 103F, 103G, 103J (as well as the angle grinder hanger) is affixed to mounting plate 125 and thus to a respective cart 102. Thus, the respective accessory 103A, 103B, 103C, 103D, 103E, 103F, 103G, 103J (as well as the angle grinder hanger) is coupled with frame 108 at a select location of cart 102.

Pegboard panel 103A can be made in narrow or wide versions. The narrow version can have 0.25 inch diameter, 1 inch spacing therebetween, a hole array of 10×6, and be made of 14 gauge steel heavy duty. The wide version can alternatively have a hole array of 20×6.

Clamp hanger rail 103B is shown in FIG. 1 to have a plurality of clamps hanging thereon. Clamp hanger rail 103B can be made in narrow and wide versions. The narrow version can have seven clamp notches and be made of 14 gauge steel heavy duty. The wide version can have thirteen clamp notches.

Fixture setup pin rail 103C can be made in narrow and wide versions. The narrow version can have 21 holes for carrying 16 mm pins, can have 12 holes to add stems, can be installed inside or outside of cart 102 (that is, at an outside perimeter of cart 102, or conversely at an interior edge of cart 102), and can be made of 14 gauge steel heavy duty. The wide version can have 45 holes for carrying 16 mm pins and can have 28 holes to add stems.

Drawer 103D can be made in various versions, each including a fixed portion and a slidable portion. One version is the shallow depth and narrow width version, which can have interior dimensions of 8.8 width×14.8 length×2.4 depth (i.e., in inches), can have full travel ball bearing slides, have a capacity of 100 lbs., can have a covered top to keep out debris, and can be made of 14 gauge steel heavy duty. Another version is the medium depth and narrow width version, which can have interior dimensions of 8.8 width×14.8 length×3.9 depth (i.e., in inches). Another version is the shallow depth and wide width version, which can have interior dimensions of 18.8 width×14.8 length×2.4 depth (i.e., in inches). Another version is the medium depth and wide width version, which can have interior dimensions of 18.8 width×14.8 length×3.9 depth (i.e., in inches).

Bin box panel 103E can include bin boxes and a rail, and can be made in narrow and wide versions. The narrow version can have two bins which are made of plastic, can have a bin size of 4⅛ inches width×5⅜ inches length×3 inches height, and the rail can be made of 14 gauge steel rail heavy duty. The wide version can have four bins.

Storage shelf 103F can be made in narrow or wide versions. Shelf 103F can have a generally U-shaped cross-section, wherein the side flanges are at a front portion of shelf 103F. The narrow version can have dimensions of 10 inches inside width×2½ inches height (alternatively, 4 inches height)×15¾ inches depth, can be made of 14 gauge steel heavy duty, and can optionally be used with small parts organizers (i.e., Milwaukee packout). The wide version can have dimensions of 20 inches inside width×2½ inches height (alternatively, 4 inches height)×15¾ inches depth.

Spray can shelf 103G can be made in narrow or wide versions. The narrow version can have 3⅝ inches depth×12 inches width, and can be made of 14 gauge steel heavy duty. The wide version can have 3⅝ inches depth×22 inches width. The wide version is configured for holding a plurality of spray cans and can optionally storing the tabletop weld screen thereon.

Drawer divider 103H (FIG. 3) is configured for being inserted into a respective drawer 103D so as to organize the space defined by drawer 103D and thereby add configurable divided drawer sections. Drawer divider 103H can be formed as a grid. Drawer divider 103H can be made in narrow and wide versions. The narrow version fits inside narrow drawers 103D, can have dimensions of 1⅜ inches height×2½ inches spacing pitch, can include five dividers for drawer width and four dividers for drawer length, and can be made of 14 gauge steel rail heavy duty. The wide version fits inside wide drawers 103D, can have dimensions of 1⅜ inches height×2½ inches spacing pitch, and can include five dividers for drawer width and xix dividers for drawer length. The wide version can optionally include a set up pin tray 103I (FIG. 3) that mounts atop at least a portion of the wide version of drawer divider 103H.

Blanking closeout plate 103J has a flat, rectangular configuration and has side holes 127. Blanking closeout plate 103J lacks holes of a pegboard panel. Instead, blanking closeout plate 103J are configured to selectively close up or cover unused portions of carts 102, where there might otherwise have been another accessory. Blanking closeout plate 103J can be made in narrow or wide versions. For example, one version of blanking closeout plate 103J can cover a 4½ inches tall opening and can be made of 14 gauge steel rail heavy duty.

The tabletop weld screen ("weld screen") can be a temporary weld screen such that the weld screen can be readily emplaced on top of or removed from tabletop 109. The weld screen can be rectangular in shape, have an aluminum frame and a polycarbonate screen window (with red tint), and can have dimensions of 18 inches by 26 inches. The weld screen can include magnets on the short and long edges of the rectangular frame (for example, three magnets on each edge), in order to orient selectively the weld screen tall (thus, standing on a short edge) or wide (thus, standing on a long edge). The magnets enable the weld screen to magnetically couple with a top surface of tabletop 109.

The angle grinder hanger is a vertical hanger and is configured to hang an angle grinder vertically. The angle grinder hanger includes a plate with two lateral sides each with vertically aligned holes 127, except that this plate has a narrow width and thus a narrow lateral extent such that the vertically aligned holes line up with only one set of vertically aligned holes 126 not both sets of vertically aligned holes 126. Further, the angle grinder hanger includes a bracket with an upper portion, a lower portion, and a center portion that is connected to the plate. The upper portion is horizontally offset from the center portion and includes a U-shaped cutout projecting upwardly and situated parallel to the center section, the U-shaped cutout including forks which are configured for receiving therebetween a portion of the angle grinder hanger so that the angle grinder hanger hangs thereby in this cutout. The bottom portion includes a U-shaped trough situated perpendicular to the center section, the U-shaped trough configured for receiving wrapped therearound electrical cord or wire for the angle grinder hanger. The angle grinder hanger fits most 4½ inch to 5 inch angle grinders. The angle grinder hangs by a blade guard, which is the U-shaped cutout including the forks. The center section includes a pin on which to hang extra grinding wheels. The angle grinder hanger can be made of 14 gauge steel rail heavy duty. The angle grinder hanger fits any location of carts 102 except on cart 102A above controller 219.

Additional accessories 103 include a fence block, 1-2-3 blocks, step pins, step pins, double pins, setup rings, shims, and a quick angle device. The fence block can have offsets from ⅜ inch to 2 inches in ⅛ inch increments depending upon orientation. The 1-2-3 block can function as a spacer, a setup block, and a fence, and can create a ½ inch, 1 inch, or 1½ inch offset if used with table pin holes. The step pin has a 1 inch outside diameter head and is ¼ inch thick, can be used as a rest pad to lift material off a fixture plate, and can work with shims to set a height. The double pin has a 1 inch outside diameter shoulder and a 16 mm pin, and can be used with shims to create side locators, and can be used with fence blocks as locators to table holes (i.e., holes 113). Setup rings can be used on double pins, wherein diameter increments set a stop distance from a centerline in fine increments, wherein 1 inch outside diameter up to 2 inch outside diameter in 1/16 inch increments can provide 1/32 inch distance offset to a part. Shims can be 1 inch outside diameter and have a height of 1/32, 1/16, ⅛, and ¼ inch, can be placed under step pins to alter vertical height, can be stacked under rings or fence blocks, and multiple shims can be stacked to create height offsets in 1/32 inch increments. The quick angle device is a quick way to set a fence from 0-45° in 5° increments, can include a 22.5°. Further, using double pins and/or rings can also set a specific location.

Figure 2:
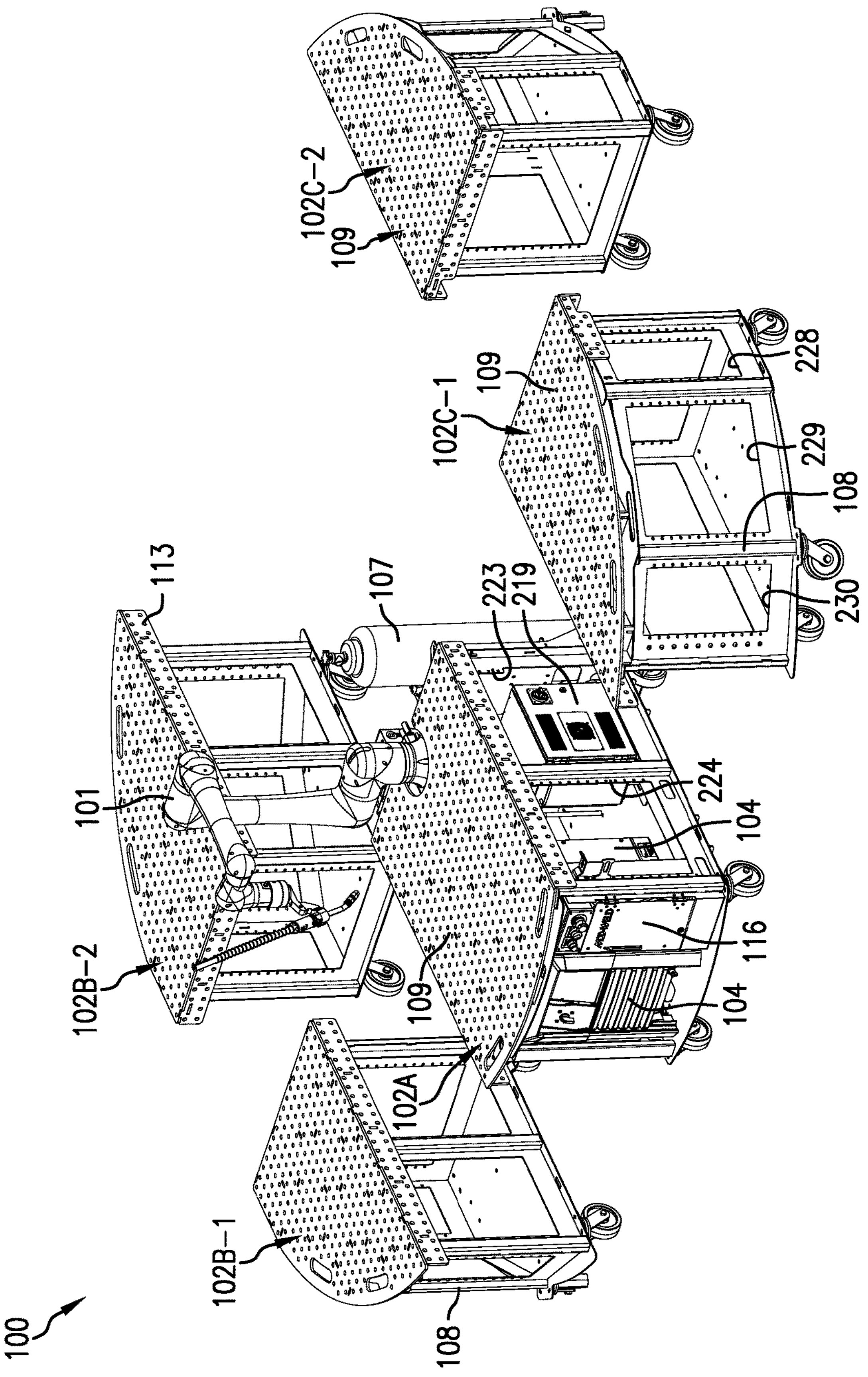
FIG. 2 illustrates an exploded perspective view of the cobot welding system of FIG. 1, with portions broken away, in accordance with an exemplary embodiment of the present invention.

Referring now to FIG. 2, there is shown an exploded perspective view of cobot welding system 100, with portions broken away for illustrative purposes. All carts 102 are shown exploded from one another, and no accessories 103 are shown in FIG. 2.

System 100 can also include a control system (not labeled) including a controller 219 which is operably coupled with, and configured for controlling the actions of, cobot 101. Controller 219 is carried by and thus coupled with frame 108 of base cart 102A in any suitable manner, such as by way of fasteners or the like. Controller 219 may correspond to any suitable processor-based device, such as a computing device or any combination of computing devices. Controller 219 may generally include one or more processor(s) and associated memory configured to perform a variety of computer-implemented functions (e.g., performing the methods, steps, algorithms, calculations and the like disclosed herein). Thus, controller 219 may include a respective processor therein, as well as associated memory, data, and instructions, each forming at least part of the respective controller 219. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory may generally be configured to store information accessible to the processor(s), including data that can be retrieved, manipulated, created, and/or stored by the processor(s) and the instructions that can be executed by the processor(s). In some embodiments, data be stored in one or more databases. The control system of system 100 can further include input/output device 720, which can be formed as handheld tablet 720 (tablet 720 is not shown in FIG. 2 but can be presumed to be stored in storage container 116). Tablet 720 is operatively coupled with controller 219. Tablet 720 is configured for enabling a user to interface with tablet 720, for example to input selectively information or commands into tablet 720 and to display output information, such as by way of a display screen. As is known, tablet 720 is configured for enabling the fabricator to teach cobot 101 with reference to performing a welding operation. Such teaching can include the fabricator manually (i.e., by hand) an arm of cobot 101 to certain positions corresponding to one or more welding operations, so that cobot 101 performs a desired welding operation.

Tabletop 109 of each cart 102 can include a horizontal portion 221 and a vertical skirt portion 222 attached to, or otherwise formed integral with, horizontal portion 221. Both horizontal portion 221 and vertical skirt portion 222 include holes 113 of any suitable shape and patterned in any suitable configuration. For example, holes 113 of each cart 102 can optionally be round and arranged in a grid-like manner, as shown. Holes 113 can be arranged in the same pattern on each cart 102A, 102B, 102C, such that when two carts 102 are positioned adjacent to one another the pattern of holes 113 is substantially uninterrupted. Though it can be appreciated that the present invention is not limited to any specific dimensions or sizes, holes 113 optionally can have a 16 mm diameter and be arranged in a 2 inch×2 inch hole pattern. Holes 113 of horizontal portion 221 and vertical skirt portion 222 are configured for having attached thereto anything that may facilitate the welding operation, such as elements of a welding fixture, using any suitable attachment devices; such a welding fixture is configured for holding parts to be welded together, for example, and can be custom made. Further, holes 113 of vertical skirt portion 222 can be used to fasten together adjacent carts 102, such as by way of bolts (extending through aligned holes 113) and nuts and/or any other suitable fasteners or the like. Carts 102 can be selectively connected directly to one another by way of respective vertical skirt portions 222. Vertical skirt portions 222 of respective ones of carts 102A, 102B, 102C can be positioned adjacent to one another, holes 113 of adjacent vertical skirt portions 222 can be aligned with one another, and fasteners can extend through aligned holes 113 so as to directly connect adjacent ones of carts 102A, 102B, 102C with one another. Tabletop 109 can further include elongate and/or curved holes configured for enabling a user to manually take hold of a respective cart 102 and thereby to move cart 102 from one location to another location.

As indicated above, accessories 103 may be manufactured in different sizes and placed at different parts of carts 102, depending for example on the amount of space available for the respective accessory 103, which can be dictated, for example, by what else is mounted to a respective cart 102 and/or the shape of the respective cart 102. Further, certain locations on a respective cart 102 may overlap with one another, which may require staggering accessories 103 with respect to the height of the respective accessories 103. With respect to base cart 102A, because of various other structures carried by cart 102A (i.e., power supply 104, wire feed assembly 106, shielding gas container 107, storage container 116, controller 219), a respective accessory 103 coupled with base cart 102A must be selected such that the respective accessory 103 fits within spaces that are not occupied with such other structures. Thus, the selected accessory 103 to be mounted to base cart 102A may have depth and/or height restrictions, depending upon the location that one may wish to mount the respective accessory to base cart 102A. For instance, location 223 has no depth restriction, but controller 219 caused a height restriction for a respective accessory 103. On the other hand, location 224 has no height restriction but does present a depth restriction (because of power supply 104) and a width restriction (because of container 116). With respect to side carts 102B, 102C, certain depth and height restrictions may apply (in terms of the standardized accessories 103 that are made). For example, with respect to cart 102C-1, locations 228 and 229 effectively have no depth or height restrictions. Location 230 effectively has no height restriction, but an angle formed by cart 102C-1 at location 230 creates a depth restriction.

Figure 3:
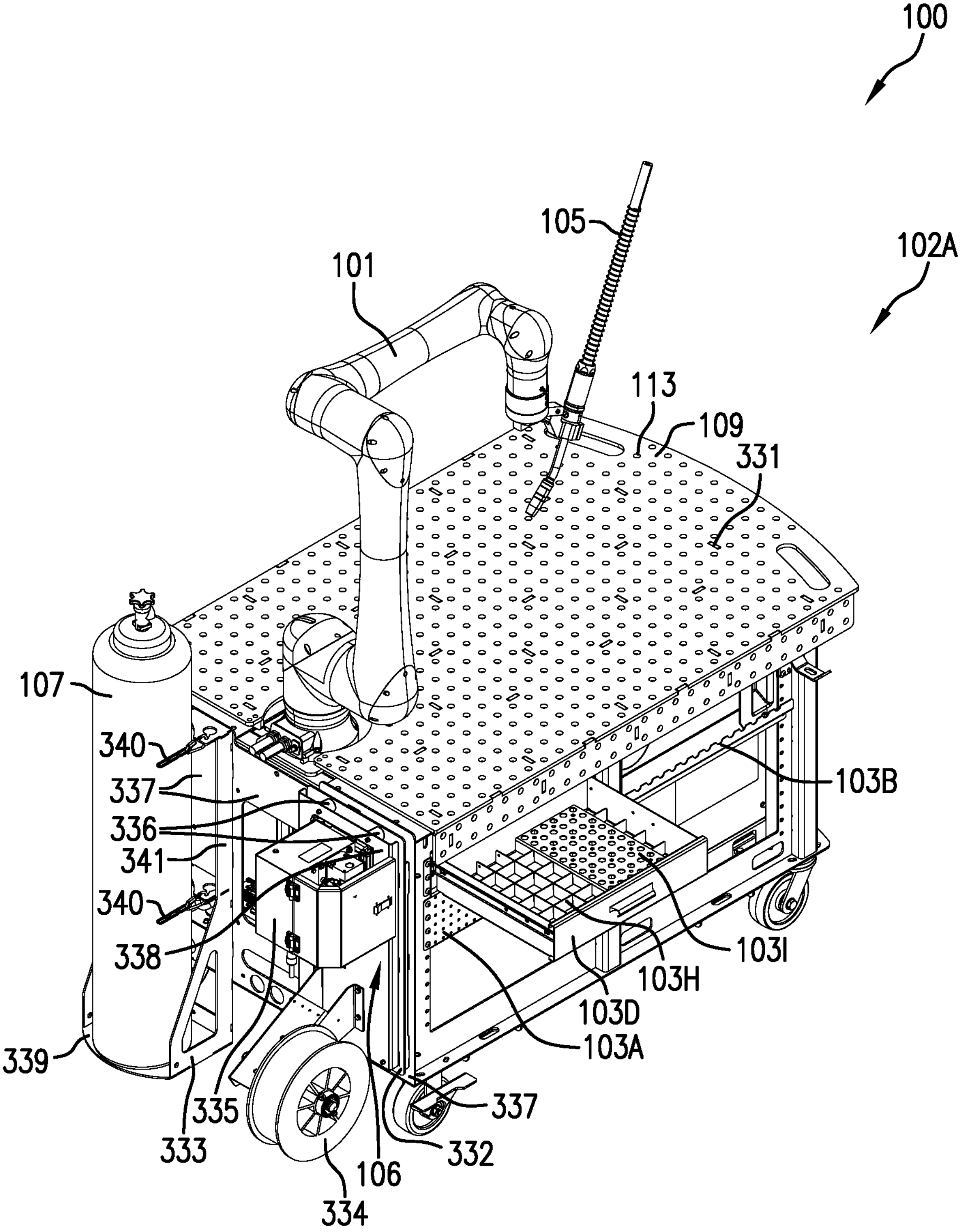
FIG. 3 illustrates a perspective view of a base cart of the cobot welding system of FIG. 1, in accordance with an exemplary embodiment of the present invention.

Referring now to FIG. 3, there is shown a perspective view of system 100. Tabletop 109 is shown to include oblong-shaped projections 331 of a ribbed arrangement 651 (FIG. 6) of tabletop 109, these projections 331 enabling ribbed arrangement 651 to attach to and thereby be formed integral with horizontal portion 221 of tabletop 109 (by way of mating slots in tabletop 109), such that the top surface of tabletop 109 is substantially flat. Though visible in these figures, projections 331 and the mating slots in tabletop 109 can be formed integral and smoothed over in the finished product so that projections 331 and the mating slots are substantially indiscernible. Ribbed arrangement 651 can be made of stainless steel, for example.

Base cart 102A further includes wire feed assembly 106 coupled with frame 108, shielding gas container 107 coupled with frame 108, mounting plate 337 attached to frame 108 in any suitable manner (such as fasteners and/or welding), a wire feed assembly mounting device 332, and a shielding gas container mounting device 333. Wire feed assembly 106 further includes an assembly plate 338 to which spool 334 and wire/gas supply device 335 are attached. Wire feed assembly 106 further includes a plurality of isolators 336 (i.e., four) attached to assembly plate 338.

Wire feed assembly 106 is coupled with frame 108 by way of wire feed assembly mounting device 332 which is configured for supporting wire feed assembly 106. That is, assembly plate 338 couples with mounting device 332 by way of fasteners (such as a bolt and nut combination extending through assembly plate 338, each isolator 336, and mounting device 332. Further, mounting device 332 attaches to mounting plate 337 (as described below).

Shielding gas container mounting device 333 includes a horizontal base support 339 for substantially carrying the weight of container 107, and further includes upper and lower capture devices 340 such as chains 340 (not fully shown) for securing container 107 to a frame 341 of mounting device 333. Each chain 340 can be looped inside a hole on one lateral side of frame 341 at one end of chain 340 and dropped down into a slot extending from a similar hole on an opposing and mirroring lateral side of frame 341 at the opposing end of chain 340. Shielding gas container 107 is coupled with frame 108 by way of shielding gas container mounting device 333 which is configured for supporting shielding gas container 107. Further, mounting device 333 attaches to mounting plate 337 (as described below).

Figure 4:
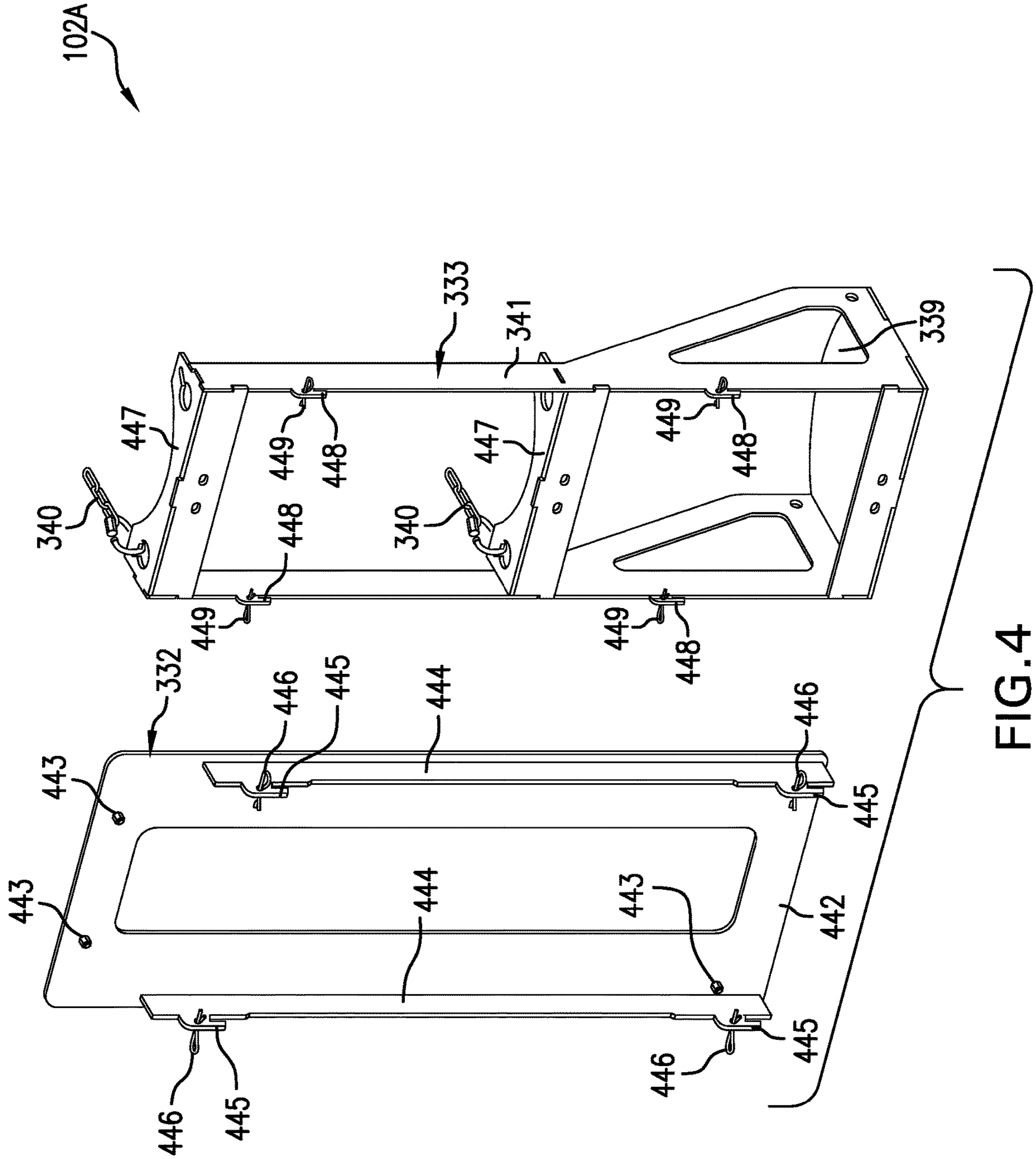
FIG. 4 illustrates a perspective view of the base cart of the cobot welding system of FIG. 1, with portions broken away, the base cart including mounting devices in side-by-side arrangement, in accordance with an exemplary embodiment of the present invention.

Referring now to FIG. 4, there is shown a perspective view of base cart 102A with portions broken away, but including mounting devices 332 and 333 in side-by-side arrangement. Mounting device 332 (which can be made in any suitable manner and be made of any suitable material, such as stainless steel) includes a baseplate 442, holes 443 (i.e., four holes 443, each of which is shown filled with a fastener in FIG. 4), two rails 443 attached to baseplate 442 (such as by welding, molding, casting, or the like), hooks 445 (i.e., four hooks) formed integral with rails 443, and pins 446 (one for each hook 445). Holes 443 are that by which fasteners attach assembly plate 338 to mounting device 332. Hooks 443 attach to elongate holes 550 (FIG. 5) in mounting plate 337. Each pin 446 extends through a corresponding hole formed in hook 445, are thereby secured to each hook 445, and are thereby used to secure hooks 443 to mounting plate 337.

Mounting device 333 (which can be made in any suitable manner and be made of any suitable material, such as stainless steel) includes upper and lower supports 447 of frame 341. Frame 341 further includes hooks 448 (i.e., four hooks) formed integral with frame 341, and pins 449 (one for each hook 448). Hooks 448 attach to elongate holes 550 (FIG. 5) in mounting plate 337. Each pin 449 extends through a corresponding hole formed in hook 448, are thereby secured to each hook 448, and are thereby used to secure hooks 448 to mounting plate 337.

Figure 5:
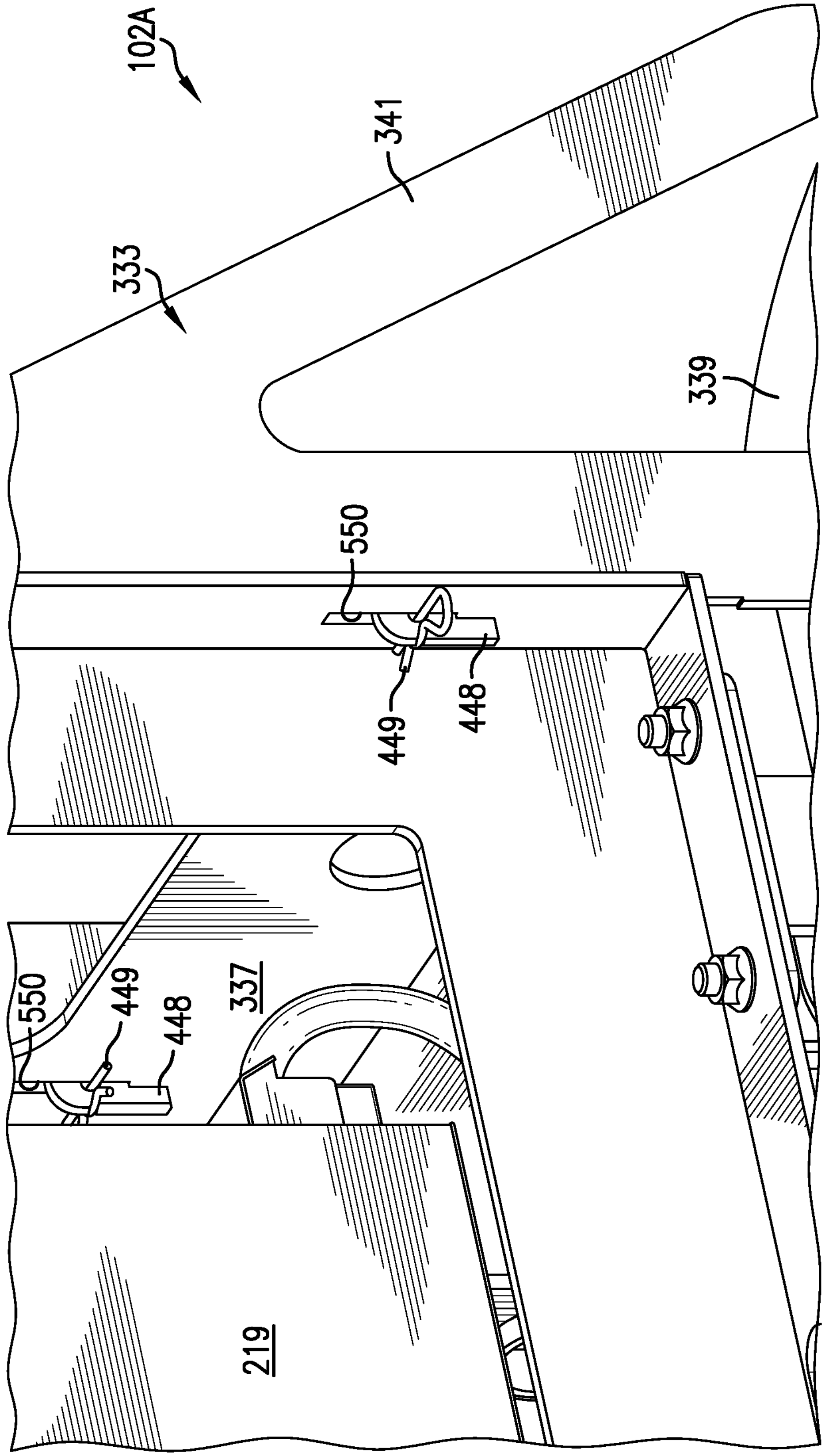
FIG. 5 illustrates a perspective view of the base cart of the cobot welding system of FIG. 1, with portions broken away, in accordance with an exemplary embodiment of the present invention.

Referring now to FIG. 5, there is shown a perspective view of base cart 102A, with portions broken away. FIG. 5 is a zoomed-in view of a bottom portion of mounting device 333, showing the bottom two hooks 448 attached to mounting plate 337. Mounting plate 337 includes elongate mounting holes 550, in total eight such mounting holes 550, four mounting holes 550 for mounting device 333 thereto, and four mounting holes 550 for mounting device 332 thereto (though only two such mounting holes 550 are shown in FIG. 5). Hooks 448 are inserted into mounting holes 550 and dropped down so that hooks 448 hook over mounting plate 337. Then, pins 449, which are secured respectively each hook 448, block hooks 448 from retreating back through mounting holes 550. This description in this paragraph of how bottom hooks 448 (together with bottom pins 449) are secured to bottom mounting holes 550 serves as a description of how upper hooks 448 (together with bottom pins 449) are secured to upper mounting holes 550 associated with mounting device 333. Similarly, this description in this paragraph of how bottom hooks 448 (together with bottom pins 449) are secured to bottom mounting holes 550 also serves as a description of how hooks 445 (together with pins 446) are secured to mounting holes 550 associated with mounting device 332.

Figure 6:
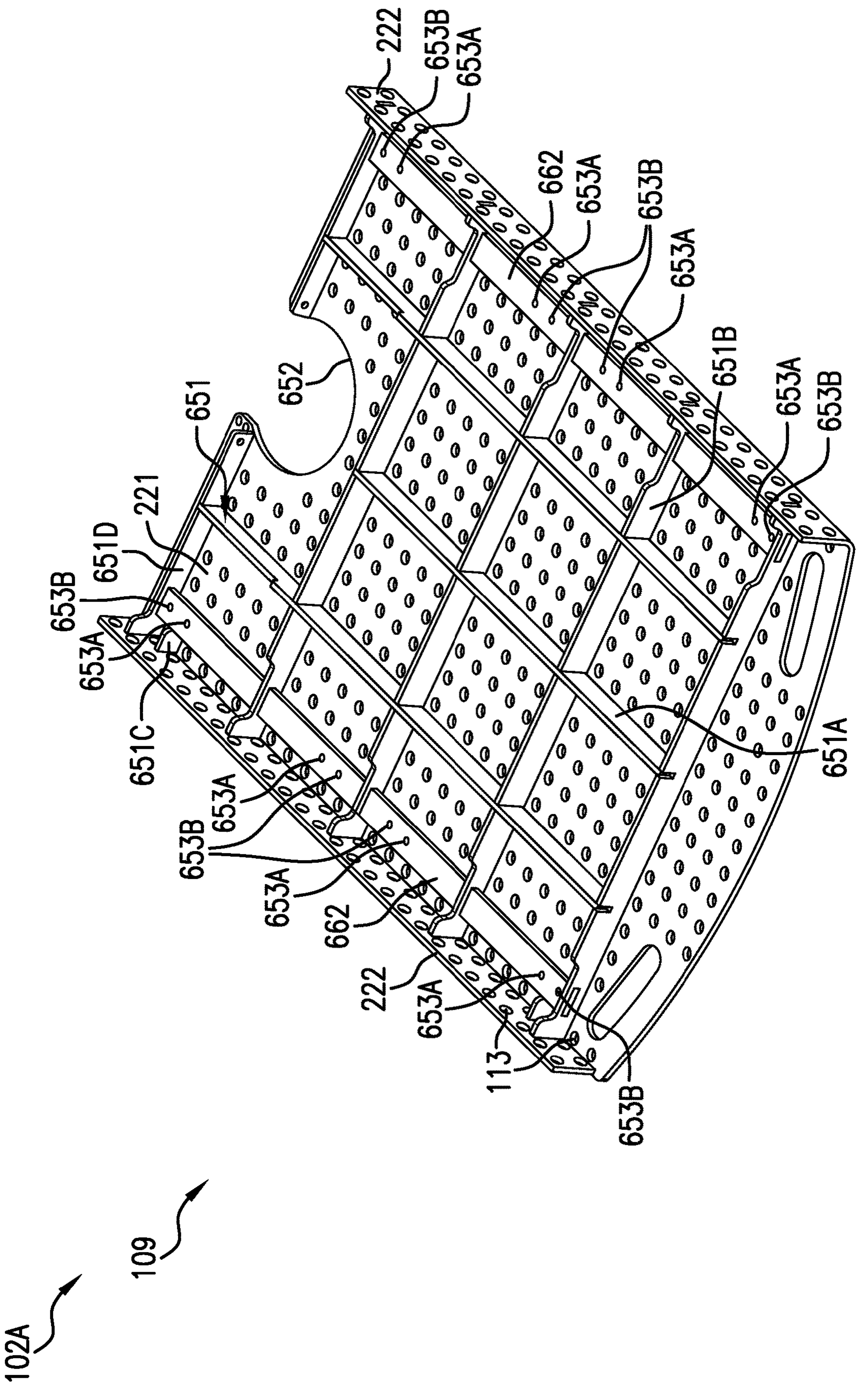
FIG. 6 illustrates a bottom perspective view of a tabletop of the base cart of the cobot welding system of FIG. 1, in accordance with an exemplary embodiment of the present invention.

Referring now to FIG. 6, there is shown a bottom perspective view of tabletop 109 of base cart 102A. FIG. 6 shows horizontal portion 221, vertical skirt portion 222, and holes 113, as well as a cutout 652 of tabletop 102 which at least partially encircles cobot 101. FIG. 6 also shows that tabletop 109 further includes rib arrangement 651, which is formed by a grid-like pattern of ribs 651A, 651B, 651C, 651D oriented perpendicularly relative to one another. Rib arrangement 651 provides support for tabletop 109. Ribs 651A, 651B, 651C, 651D are oriented such that a flat expanse of each rib 651A, 651B, 651C, 651D is positioned substantially perpendicularly relative to horizontal portion 221. Tabletop 109 further includes mounting bar 662, which is oriented such that a flat expanse of each mounting bar 662 (two such bars 662) is positioned substantially parallel relative to horizontal portion 221. Each bar 662 is a ⅜ inch thick piece of steel that is welded to other portions of tabletop 109. Each bar 662 includes holes 653A, 653B through a thickness of each bar 662 (thus, perpendicularly to the flat expanse). Ribs 651C are shortened ribs and interact with bar 662. The parts of tabletop 109 shown in FIG. 6 (i.e., horizontal portion 221, vertical skirt portion 222, ribs 651A, 651B, 651C, 651D, and bar 662 can all be made of any suitable material, such as stainless steel, and all these parts can be welded together such that tabletop 109 forms a weldment.

Further, though not shown, it can be readily appreciated that tabletops 109 of each of side carts 102B, 102C are substantially similar to tabletop 109 of base cart 109, except primarily with respect to the shape of tabletop 109 of side carts 102B, 102C. Thus, tabletops 109 of side carts 102B, 102C also include horizontal portion 221, vertical skirt portion 222, holes 113, rib arrangement 651 (including ribs 651A, 651B, 651C, 651D), mounting bars 662, and holes 653A, 653B in bars 662; thus, a separate description and figure with respect to the bottom views of tabletops 109 of side carts 102B, 102C is not provided.

Figure 7:
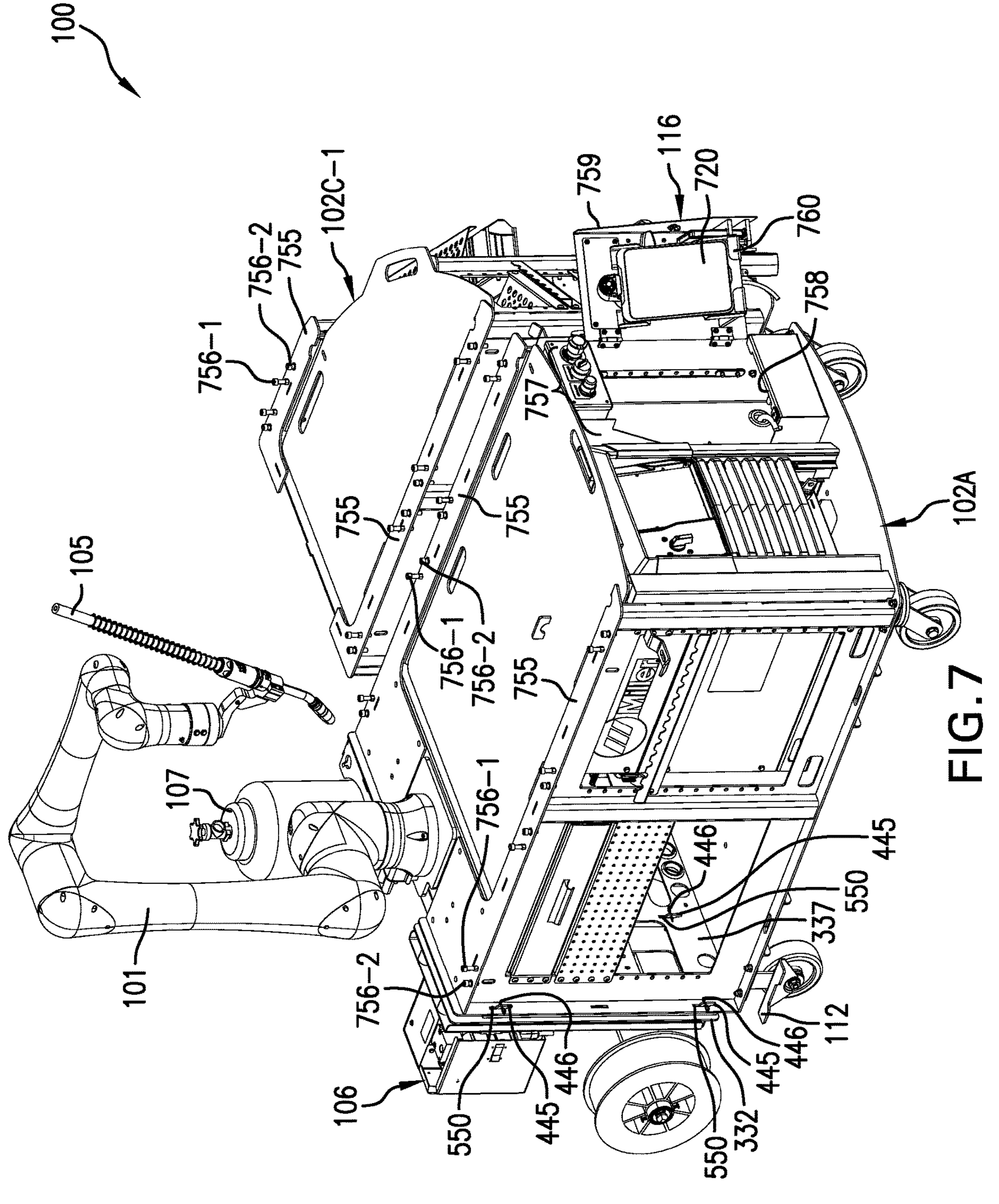
FIG. 7 illustrates a perspective view of the cobot welding system of FIG. 1, with portions broken away, in accordance with an exemplary embodiment of the present invention.

Referring now to FIG. 7, there is shown a perspective view of cobot welding system 100, with portions broken away. FIG. 7, for illustrative purposes, shows only base cart 102A and side cart 102C-1, both with tabletops 109 removed. Base cart 102A further includes a series of three manual controls 757 that are manually operated by the user, controls 757 being used by user to operate cobot 101 to perform the welding operation. Controls 757 can be formed as a series of buttons, or the like. One control 757 is a cycle start; another control 757 is for selecting a teaching mode; and another control 757 (the far-right control 757) is an emergency stop.

Further, FIG. 7 shows storage container 116 for storing therein tablet 720. Storage container 116 serves to enclose tablet 720 when tablet 720 is not being used and thereby to keep it safe from the environment. Storage container 116 includes a storage well 758 and a hinged door 759 configured to be selectively opened and closed so as to grant access to tablet 720 or to enclose storage well 758 and thus also table 720 within storage well 758. Further, door 759 includes a holder 760 attached to an inside surface of door 759, holder 760 shown in FIG. 7 to be supporting the four corners of tablet 720. Holder 760 includes safety devices. A cable extending below container 116 is visible in FIG. 7, this cable being used to connect tablet 720 to cobot controller 219. Further, tablet 720 is shown to include a circular structure at a top portion of tablet 720, this circular structure being an emergency stop button.

FIG. 7 further shows that base cart 102A and side cart 102C (and thus also side cart 102B) also includes fastener arrangements 756-1, 756-2. Fastener arrangements 756-1, 756-2 are shown in FIG. 7 as being dispersed near certain edges of carts 102A, 102C (and thus also cart 102B). In FIG. 7, fastener arrangements 756-1 are shown to be positioned higher than fastener arrangements 756-2. Base cart 102A is shown to include sixteen fastener arrangements 756-1, 756-2, more specifically, eight fastener arrangements 756-1, and eight fastener arrangements 756-2. Side cart 102C (and thus also side cart 102B) is shown to include twelve fastener arrangements 756-1, 756-2, more specifically, six fastener arrangements 756-1, and six fastener arrangements 756-2.

Further, frame 108 of each cart 102 (including carts 102A, 102B, 102C) includes an upper plate 755 that forms part of a weldment that is frame 108. According to one embodiment of the present invention, plate 755 is about 3/16 inches thick. Further, plate 755 includes hexagon-shaped cutouts 861 (FIG. 8) (formed as holes through the thickness of plate 755), each of these hexagon-shaped cutouts 861 receiving therein a part of a respective one of fastener arrangements 756-1, 756-2 (thus, plate 755 of base cart 102A includes sixteens such hexagon-shaped cutouts 861, and each of side carts 102B, 102C includes twelve such hexagon-shaped cutouts 861). During manufacturing of cart 102A (and thus also carts 102B, 102C), tabletop 109 (as a single weldment) is attached to frame 108, which can be referred to as a welded steel cart chassis. In making this attachment, fastener arrangements 756-1 are used, and fasteners 756-2 are used to level tabletop 109 as part of a leveling arrangement 854 that tabletop 109 of each cart 102 includes.

Figure 8:
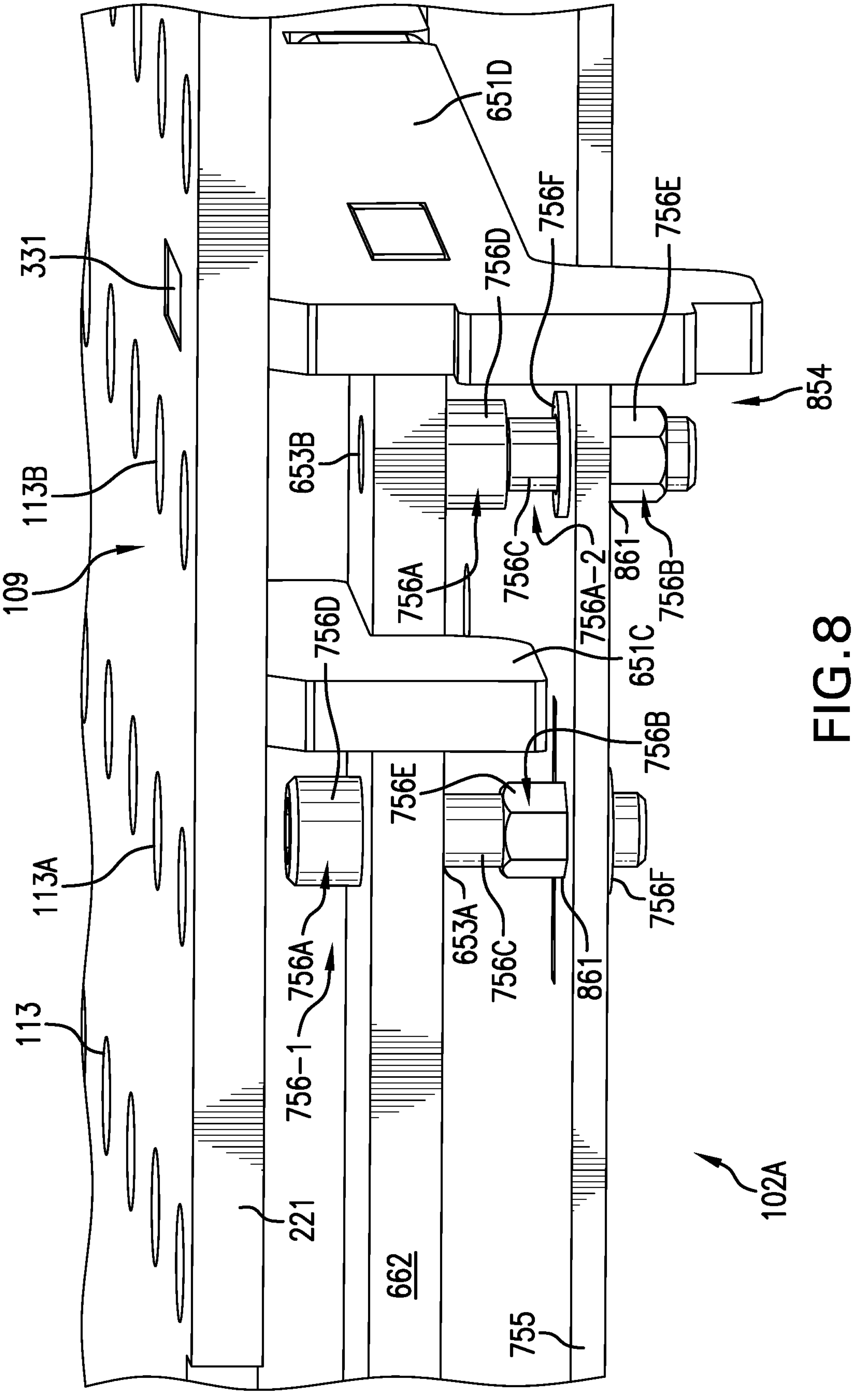
FIG. 8 illustrates a perspective view of the base cart of the cobot welding system of FIG. 1, with portions broken away.

Referring now to FIG. 8, there is shown a perspective view of base cart 102A, with portions broken away. Vertical skirt portion 222, among other portions, is broken away. FIG. 8 is a zoomed-in view with tabletop 109 mounted to other portions of base cart 102A. The vicinity of this zoomed-in view is the top-left portion of tabletop 109 shown in FIG. 6 (as viewing FIG. 6 on the page of FIG. 6), thus the top-right portion of base cart 102A shown in FIG. 7 (as viewing FIG. 7 on the page of FIG. 7), and thus the top-right portion of base cart 102A in FIG. 2 (as viewing FIG. 2 on the page of FIG. 2). FIG. 8 thus shows generally how tabletop 109 (as a unified weldment) attaches to upper plate 755 of frame 108 using primarily fastener arrangement 756-1, and generally how tabletop 109 is leveled using primarily fastener arrangement 756-2. The portion of tabletop 109 shown in FIG. 8 is representative of all fastener arrangements 756-1, 756-2 of all carts 102 and how these arrangements 756-1, 756-2 are used.

Each fastener arrangement 756-1, 756-2 includes a socket head cap screw 756A and a rivet nut 756B. Screw 756A includes a threaded shaft 756C and a head 756D attached thereto. Head 756D includes a hexagon-shaped socket configured to receive therein a hexagon-shaped wrench or tool (such as an Allen wrench or, more specifically, a screw-holding T-handle key) (referred to herein as "the hex tool") configured to tighten or loosen screw 756A. The hex tool (not shown) can have a handle for gripping and a longitudinal shaft extending substantially perpendicular to the handle, this shaft having a longitudinal axis running from the handle to the distal tip configured for engaging head 756D, this longitudinal axis being straight and thus lacking 90° bend. Rivet nut 756B can be, for example, a heavy duty twist-resistant rivet nut. Rivet nut 756B includes a hexagonal barrel 756E and a round flange 756F attached to barrel 756E. Rivet nut 756B includes a longitudinally extending round bore therethrough, wherein the portion of the bore associated with barrel 756E is at least partially threaded.

During manufacture of cart 102, before attaching tabletop 109 to frame 108, fastener arrangements 756-1, 756-2 are affixed to upper plate 755 by way of hexagonal cutouts 861 formed in plate 755. A respective hexagonal barrel 756E of rivet nut 756B is inserted in a respective hexagonal cutout 861, and a known tool is used such that barrel 756E gets compressed to provide for affixation to cutouts 861. The hexagonal shape of barrel 756E and cutouts 861 provide that rivet nuts 756B do not rotate in cutouts 861. Further, because the material of plate 755 is thin, rivet nuts 756B add strength for the threads of screws 756A. With respect to fastening arrangement 756-1, rivet nut 756B is installed with flange 756E at a bottom surface of plate 755; the portion of rivet nut 756B on the opposite side of plate 755 than flange 756F gets crimped. With respect to fastening arrangement 756-2, rivet nut 756B is installed with flange 756E at a top surface of plate 755; the portion of rivet nut 756B on the opposite side of plate 755 than flange 756F gets crimped.

Then, before attaching tabletop 109 to frame 108, screw 756A of fastening arrangement 756-2 is threaded into the bore of barrel 756E of rivet nut 756B of fastening arrangement 756-2, without first inserting screw 756A of fastening arrangement 756-2 into hole 653B in mounting bar 662 of tabletop 109. Then, tabletop 109 can be lowered onto frame 108. More specifically, when tabletop 109 is emplaced on top of frame 108 of a respective cart 102, fastener arrangements 756-1 align with holes 653A, and fastener arrangements 756-2 align with holes 653B. Upon doing so, head 756D of screw 756A is beneath mounting bar 662. Then, to secure tabletop to frame 108, screw 756A of fastening arrangement 756-1 is inserted (from top to bottom) through a respective hole 113 (more specifically, hole 113A of holes 113) that aligns with a respective hole 653A. Upon doing so, screw 756A of fastening arrangement 756-1 is then inserted through hole 653A (which is aligned with hole 113A) in mounting bar 662 such that head 756D is at a top surface of mounting bar 662, and screw 756A of fastening arrangement 756-1 is further threaded into the bore of barrel 756E of rivet nut 756B of fastening arrangement 756-1. To accomplish the turning of screw 756A of fastener arrangements 756-1, 756-2, a user uses the hex tool. With respect to fastener arrangement 756-1, user inserts hex tool through hole 113A and then into the hexagonal socket of head 756D of fastener arrangement 756-1. With respect to fastener arrangement 756-2, user inserts the hex tool through hole 113B of holes 113, then through hole 653B of mounting bar 662, and then into the hexagonal socket of head 756D of fastener arrangement 756-2.

With respect to fastening arrangement 756-1, flange 756F being underneath plate 755 provides that the force applied when tightening screw 756A pulls against flange 756F instead of the side of rivet nut 756B that was crimped. This essentially means rivet nut 756B can never be pulled in a direction of use. When screw 756A is tightened, a clamping force from the screw 756A squeezes bar 662 towards plate 755, which pulls against flange 756F. Using rivet nut 756B means no wrench is needed from underneath to hold a nut. Fastening arrangement 756-1 is what firmly holds tabletop 109 to frame 108.

With respect to fastening arrangement 756-2, fastening arrangement 756-2 is for leveling tabletop 109. As indicated, rivet nut 756B of fastening arrangement 756-2 is installed in plate 755 with flange 756 above plate 755 and a hex crimp in barrel 756E below plate 755 (opposite what is provided with respect to fastening arrangement 756-1). This is done so that a load pushing down on screw 756A of fastening arrangement 756-2 from bar 662 pushes against flange 756F. This again is for prevention of push out. Before tabletop 109 (which includes bar 662) is placed on frame 108, (as indicated above) a series of screws 756A are installed in all the substantially similar areas. Tabletop 109 is then installed so that bar 662 rests on top of head 756D of screw 756A of fastening arrangement 756-2. Hole 653B in bar 662 is sized so that the hex tool can be inserted into the socket of the head 756D by way of the larger hole 113B in horizontal portion 221 and the smaller hole 653 in bar 662. Then, by rotating screw 756A of fastening arrangement 756-2 clockwise or counter-clockwise, user can change the height that horizontal structure 221 sits on frame 108, thereby leveling the entire tabletop 109 in all of the mounting locations (that is, any or all fastening arrangements 6756-2, 756-2 of carts 102 can be adjusted to provide for a level horizontal structure 221). When doing this, screw 756A of fastening arrangement 756-1 (which can also be referred to as the clamping screw) must be loose, so as to allow tabletop 109 to rest by gravity on screws 756A of fastening arrangements 756-2. Here, the applied forces are pushing bar 662 away from plate 775, such that flange 756F of fastening arrangement 756-2 prevents push out.

Thus, each cart 102 includes leveling arrangement 854. Leveling arrangement 854 includes plate 775, mounting bar 662, and fastening arrangement 756-2. It can be readily appreciated that leveling arrangement 854 of each cart 102A, 102B, 102C is substantially similar to one another, making necessary modifications for the different shapes of carts 102 and/or mirroring orientations.

With respect to FIGS. 6-8, in summary, with respect to fastening arrangement 756-1 the forces are applied from the top of bar 662 to the bottom of plate 775, and with respect to fastening arrangement 765-2 the forces are applied from the bottom of bar 662 to the top of plate 775.

The preset invention thus provides user with the ability to level tabletop 109 for at least the following reasons: floors (such as concrete floors) of a work area may not actually be level; manufacturing variances in carts 102 can be compensated for; and when using a side cart 102B, 102C along with base cart 102A, each tabletop 109 can be leveled and matched in height, even if the floor is not level. Further, the present invention provides that this leveling operation is a one tool function without ever having to get under tabletop 109. All access to fastening arrangements 756-1, 756-2 is from the top of horizontal structure 122 using the same tool (the hex tool) for screws 756A (the clamping screws) of fastening arrangement 756-1 and for screws 756A (the leveling screws) of fastening arrangement 756-2.

With respect to cart 102A, assembly thereof can generally occur as follows. Frame 108 is welded together. Casters 111 are attached to frame 108. Fastening arrangements 756-1, 756-2 and tabletop is emplaced, power supply 104 can be affixed to frame 104, wire feed assembly 106 and shielding gas container 107 can be attached to frame by way of mounting devices 332, 333, a riser weldment for controller 219 can be affixed to frame 108, controller 219 can be coupled with frame 108 by way of this riser weldment, container 116 can be affixed to frame 108, tabletop 109 can be affixed to frame 108, and cobot 101 can be mounted to frame 108.

Advantages of the present invention provides that system can include any or all of the following: mobile carts 102 are provided as a welded construction with a powder coat finish; FANUC CRx Collaborative Robot 101 with Miller library and APT Clever Torch teach button software package ready to teach and to weld; APT Clever Torch for ease of movement and teaching cobot 101; an additional button feature built in for tack welding; tabletop 109 of cart 102A can have ample workspace, with holes 113 for clamping and welding fixture hold-down; industry standard hole 113 spacing for interchangeable tooling and acceptance of industry standard tools; optionally, hand guide and teach without use of tablet 720 (clever torch); customizable layout of carts 102; ribbed tabletops 109 for improved strength; independent leveling for tabletops 109; reduced welder fatigue (cobot 101 is doing the welding); improved welder safety (welder can step away and remove oneself from the area while the cobot 101 is welding); slide out spatter tray is provided to keep equipment and tools clean; side carts 102B, 102C (102B-1, 102B-2, 102C-1, 102C-2, wherein carts 102B-2 and 102C-2 can also be referred to as rear carts) can be connected together with respect to base cart 102 and one another to make a larger system (i.e., system 100); and many accessories (i.e., 103) are provided that attach in many locations of carts 102, with vertical hole patterns 126, 127 for mixing and matching accessories relative to carts 102.

In use, during setup of system 100, a user can decide which carts 102 to use and in what configuration and which accessories 103 to use and where to locate accessories 103 (which is assumed to include the unnumbered accessories described herein) on carts 102. Cart 102A will be used at a minimum, but beyond that user can select other carts 102B and/or 102C. Once system 100 is setup, user can perform welding operations in conjunction with cobot 101. To perform the welding operations, user typically stands somewhere radially outward of perimeter 117. Multiple workstations can be established by user within workspace 100. User can use tablet 720 to teach cobot 101 which actions to take to perform the welding operation, and can then use tablet 720 and/or manual actuators 757 to command cobot 101 to perform the welding operation(s).

Figure 9:
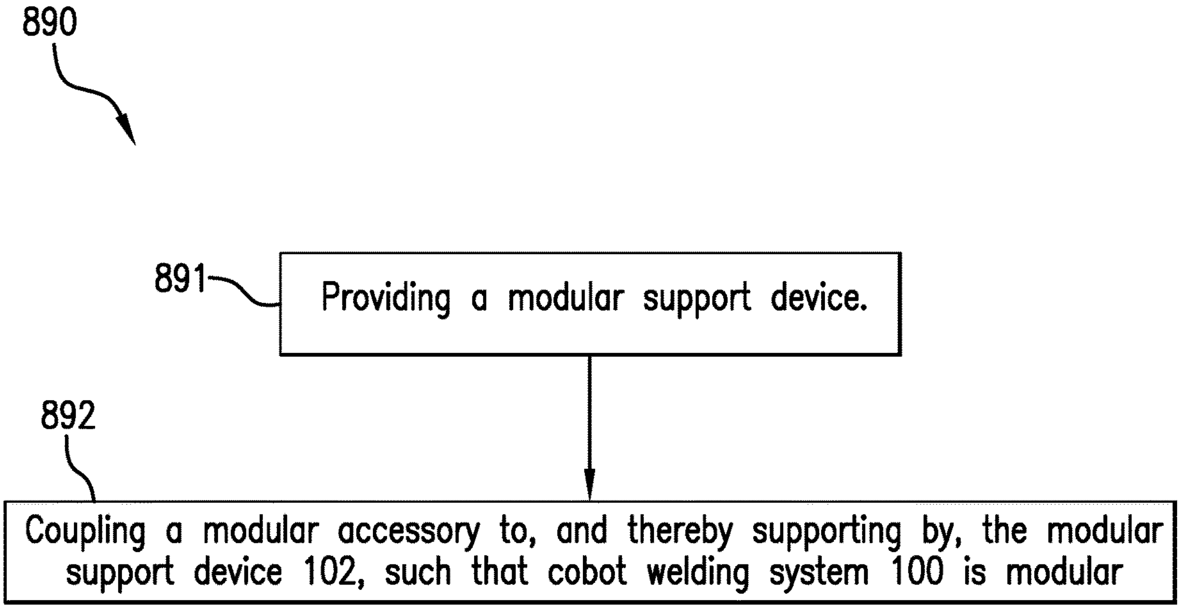
FIG. 9 illustrates a flow diagram showing a method of using the cobot welding system, in accordance with an exemplary embodiment of the present invention.

Referring now to FIG. 9, there is shown a flow diagram showing a method 980 of using cobot welding system 100. Method 980 includes the steps of: providing 981 at least one modular support device 102; and coupling 982 at least one modular accessory 103 to the at least one modular support device 102, and thereby supporting the at least one modular accessory 103 such that cobot welding system 100 is modular. System 100 can further include the at least one modular accessory 103, wherein the at least one modular support device 102 is at least one modular cart 102, wherein the at least one modular cart 102 includes a frame 108 and a horizontal support structure 221 mounted to the frame 108, the horizontal support structure 221 defining a welding workspace 110. System 100 can further include cobot 101 which is configured for performing a welding task, the at least one modular cart 102 including a first modular cart 102A to which cobot 101 is mounted. The at least one modular cart 102 can selectively include a second modular cart 102B-1 connected directly to the first modular cart 102A. The at least one modular cart 102 selectively includes a third modular cart 102C-1, a fourth modular cart 102C-2, and a fifth modular cart 102B-2, the third modular cart 102C-1 being connected directly to the first modular cart 102A, the fourth modular cart 102C-2 being connected directly to the second modular cart 102B-1, and the fifth modular cart 102B-2 being connected directly to the third modular cart 102C-1, the second modular cart 102B-1 being substantially similar to the fifth modular cart 102B-2, the third modular cart 102C-1 being substantially similar to the fourth modular cart 102C-2. The first modular cart 102A, the second modular cart 102B-1, the third modular cart 102C-1, the fourth modular cart 102C-2, and the fifth modular cart 102B-2 collectively form a substantially round perimeter 117, the cobot 101 being configured for performing the welding task selectively at the first modular cart 102A and at at least one of the second modular cart 102B-1, the third modular cart 102C-1, the fourth modular cart 102C-2, and the fifth modular cart 102B-2. The at least one modular accessory 103 is coupled with the frame 108 at a select location 223, 224, 228, 229, 230 of the at least one modular cart 102, wherein the at least one modular accessory 103 includes at least one of a pegboard panel 103A; a clamp hanger rail 103B; a fixture setup pin rail 103C; a drawer 103D; a bin box panel 103E; a storage shelf 103E; a spray can shelf 103F; a drawer divider 103H; a setup pin tray 103I; a blanking closeout plate 103J; a tabletop weld screen; and an angle grinder hanger. The at least one modular cart 102 includes a leveling arrangement 854. The first modular cart 102A includes a mounting device 332, 333 configured for supporting a wire feed assembly 106 or a shielding gas container 107. The first modular cart 102A includes a storage container 116 configured for storing therein an input/output device 720.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of using a cobot welding system, the method comprising the steps of:

providing that the cobot welding system includes at least one support device and at least one accessory;

coupling the at least one accessory to the at least one support device, and thereby supporting the at least one accessory such that the cobot welding system is modular, the at least one support device being at least two modular carts, which include a first modular cart and a second modular cart, which is detachably connected directly to the first modular cart using a plurality of fasteners and not a pipe clamp, each of the first modular cart and the second modular cart including a first edge region and a second edge region, the first edge region being a straight connection region including a vertical skirt portion, the second edge region being connected directly to the first edge region and being a convexly curved non-connection region having an absence of the vertical skirt portion, the vertical skirt portion of the first modular cart and the vertical skirt portion of the second modular cart being detachably connected directly with one another using the plurality of fasteners; and using the cobot welding system.

2. The method of claim 1, wherein each of the at least two modular carts includes a frame and a horizontal support structure mounted to the frame, the horizontal support structure defining a welding workspace.

3. The method of claim 2, wherein the cobot welding system further comprises a cobot configured for performing a welding task, the cobot being mounted to the first modular cart.

4. The method of claim 3, wherein the at least one accessory is coupled with the frame at a select location of one of the at least two modular carts, wherein the at least one accessory includes at least one of: a pegboard panel; a clamp hanger rail; a fixture setup pin rail; a drawer; a bin box panel; a storage shelf; a spray can shelf; a drawer divider; a blanking closeout plate; a tabletop weld screen; and an angle grinder hanger.

5. The method of claim 3, wherein one of the at least two modular carts includes a leveling arrangement.

6. The method of claim 3, wherein the first modular cart includes a mounting device configured for supporting a wire feed assembly or a shielding gas container.

7. The method of claim 3, wherein the first modular cart includes a storage container configured for storing therein an input/output device, the first modular cart includes the first edge region, a third edge region, and the second edge region extending between the first edge region and the third edge region, the second modular cart including the first edge region connected directly to the first edge region of the first modular cart, a third edge region having a shorter length relative to and connected directly to the first edge region of the second modular cart, a fourth edge region connected directly to the third edge region of the second modular cart, and the second edge region extending between the first edge region of the second modular cart and the fourth edge region of the second modular cart.

8. The method of claim 3, wherein the at least two modular carts include a third modular cart, a fourth modular cart, and a fifth modular cart, the third modular cart being connected directly to the first modular cart, the fourth modular cart being connected directly to the second modular cart, and the fifth modular cart being connected directly to the third modular cart, the second modular cart being substantially similar to the fifth modular cart, the third modular cart being substantially similar to the fourth modular cart.

9. The method of claim 8, wherein the first modular cart, the second modular cart, the third modular cart, the fourth modular cart, and the fifth modular cart collectively form a substantially round perimeter, the cobot being configured for performing the welding task selectively at the first modular cart and at at least one of the second modular cart, the third modular cart, the fourth modular cart, and the fifth modular cart.

* * * * *